(12) United States Patent
Williams

(10) Patent No.: US 6,454,422 B1
(45) Date of Patent: Sep. 24, 2002

(54) BACKLIT INDICIA ON A PAINTED SURFACE

(75) Inventor: Alexander K. Williams, Farmington Hills, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/697,825

(22) Filed: Oct. 26, 2000

(51) Int. Cl.⁷ .............................. G01D 11/28; B60Q 1/00
(52) U.S. Cl. .......................... 362/23; 362/29; 362/30; 362/482; 362/489
(58) Field of Search .............................. 362/23, 29, 30, 362/85, 489, 482; 40/541, 579, 580

(56) References Cited

U.S. PATENT DOCUMENTS

| | | | | |
|---|---|---|---|---|
| 3,694,945 A | * | 10/1972 | Detiker | 40/133 R |
| 4,977,695 A | * | 12/1990 | Armbruster | 40/541 |
| 5,367,441 A | | 11/1994 | Wustlich | 362/97 |
| 5,432,684 A | * | 7/1995 | Fye et al. | 362/30 |
| 5,456,955 A | | 10/1995 | Muggli | 427/555 |
| 5,899,558 A | * | 5/1999 | Suzuki et al. | 362/489 |
| 5,988,827 A | * | 11/1999 | Lee | 362/31 |
| 6,158,867 A | * | 12/2000 | Parker et al. | 362/29 |
| 6,179,430 B1 | * | 1/2001 | Le Du | 362/29 |

* cited by examiner

Primary Examiner—Thomas M. Sember
Assistant Examiner—Jacob Y. Choi
(74) Attorney, Agent, or Firm—Tarolli, Sundheim, Covell, Tummino & Szabo L.L.P.

(57) ABSTRACT

An article (10) comprises a transparent material (42) having interior and exterior surfaces (44 and 46). A coating of paint (48) is applied to the exterior surface (46) of the transparent material (42). Indicia (12) are formed in the coating of paint (48) by a plurality of interrelated line segments (50). Each line segment (50) of the plurality of line segments (50) extends parallel to each other line segment (50). The article (10) further comprises a light source (40) actuatable for directing light against the interior surface (44) of the transparent material (42) and through the line segments (50) to illuminate the indicia (12). The indicia (12) are discernible from the coating of paint (48) when illuminated by the light source (40) and are indiscernible from the coating of paint (48) when not illuminated.

11 Claims, 2 Drawing Sheets

BACKLIT INDICIA ON A PAINTED SURFACE

TECHNICAL FIELD

The present invention relates to backlit indicia on a painted surface of an article. More particularly, the invention relates to indicia that are discernible when backlit and indiscernible when not backlit.

BACKGROUND OF THE INVENTION

Backlit indicia are used on many articles. A common location for backlit indicia is on an instrument panel of a vehicle. The most common type of backlit indicia on a vehicle instrument panel is the backlit gauges located in the gauge console of the instrument panel. Prior art backlit indicia for use on an instrument panel include a transparent material that is covered by an opaque plate having the indicia formed as a cut out portion of the opaque plate. A light source is placed behind the transparent material, internal to the instrument panel. The indicia on the opaque plate is visible to the driver without being backlit but stands out more prominently when backlit.

Disadvantages with the prior art backlighting is that when the indicia is located in a region of the instrument panel outside the gauge console, the opaque plate containing the indicia is easily distinguishable from the remainder of the instrument panel. An additional disadvantage is that as more indicia are added to the instrument panel, the instrument panel begins to look more cluttered and less pleasing to the driver. This problem is becoming more apparent as the electronic monitoring technology in vehicles continues to improve. Better monitoring technology is resulting in a need for more indicia to notify the driver of vehicle conditions. More indicia results in a more cluttered appearance to the instrument panel.

Thus, a need exists for providing backlit indicia that do not require added structure to the exterior of an instrument panel and which are generally indiscernible from the instrument panel when not backlit. Ideally, the backlit indicia will provide the instrument panel with the appearance of a uniform painted surface when the indicia are not backlit, but provide discernible indicia when backlit.

SUMMARY OF THE INVENTION

The present invention is directed to an article having indicia, the indicia being discernible when back and indiscernible when not backlit. The article comprises a transparent material. The transparent material has an interior and an exterior surface. A coating of paint is applied to the exterior surface of the transparent material. A plurality of interrelated line segments is exposed in locations where a portion of the coating of paint is removed from the exterior surface of the transparent material. The line segments form the indicia. Each line segment is a groove in the coating of paint. Each groove has a bottom surface formed by the transparent material and a pair of side walls formed from the coating of paint. The side walls extend in a direction angled to a probable line of sight to the indicia. The article further comprises at least one light source for directing light against the interior surface of the transparent material and through the exposed line segments forming the indicia.

The present invention is also directed to a method of forming backlit indicia on a painted surface of an article, the indicia being discernible from the painted surface when backlit and being indiscernible when not backlit. The article is formed from a transparent material, at least in a desired location for the indicia. The transparent material has an interior surface and an exterior surface. A coating of paint is applied to the exterior surface of the transparent material. Portions of the coating of paint are removed to expose interrelated line segments. The line segments form the indicia. Each line segment is a groove in the coating of paint. Each groove has a bottom surface formed by the transparent material and a pair of side walls formed by the coating of paint. The side walls extend in a direction angled to a probable line of sight to the indicia. At least one light source is positioned to direct light against the interior surface of the transparent material and through the exposed line segments forming the indicia.

BRIEF DESCRIPTION OF THE DRAWINGS

The foregoing and other features of the-present invention will become apparent to those skilled in the art to which the present invention relates upon reading the following description with reference to the accompanying drawings, in which.

DETAILED DESCRIPTION OF THE PREFERRED EMBODIMENT way of example, the article of the present invention will be discussed as a vehicle instrument panel 10. Although a vehicle instrument panel 10 is the preferred embodiment of the invention, those skilled in the art will recognize that the article may be any article bearing backlit indicia 12.

Figure 1:
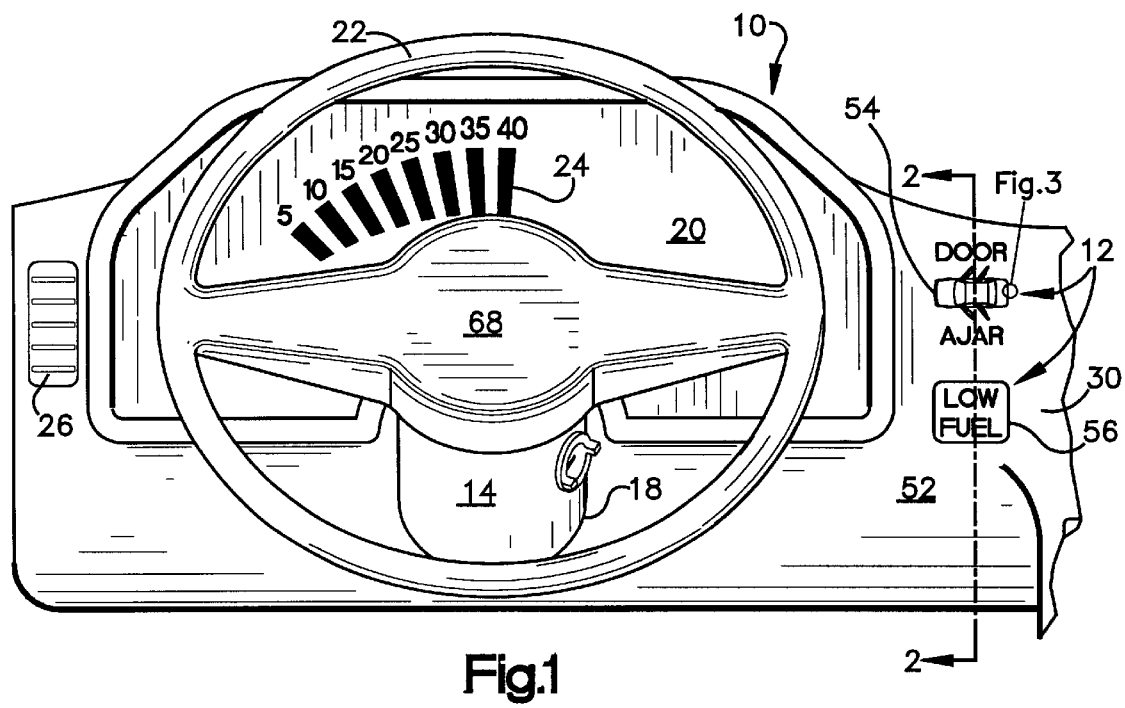
FIG. 1 is an embodiment of the present invention located on a portion of a vehicle instrument panel.
Figure 2:
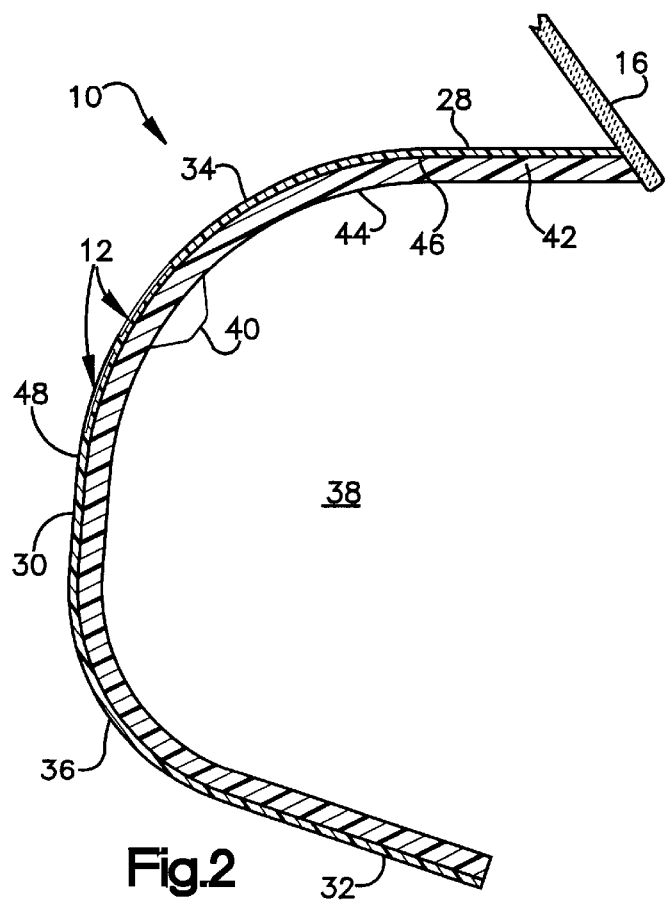
FIG. 2 is a cross-sectional view of FIG. 1 taken along line 2—2.

FIG. 1 shows a portion of the vehicle instrument panel 10. The instrument panel 10 extends in the vehicle laterally from a driver-side door (not shown) to the passenger-side door (not shown) and vertically from a position near the steering column 14 to a position meeting a bottom surface of the vehicle windshield 16, as best seen in FIGS. 1 and 2. The instrument panel 10 includes an opening 18 through which the steering column 14 extends and a gauge console 20, generally located directly behind the steering wheel 22 of the vehicle. The gauge console 20 includes the primary gauges of the vehicle such as the speedometer 24, the fuel capacity gauge (not shown) and an oil pressure gauge (not shown). The instrument panel 10 also includes vents 26 for allowing air flow into the vehicle compartment. The instrument panel 10 further includes a central console (not shown) where environmental controls such as heating and air conditioning controls and audio entertainment controls are located. On the passenger-side of the vehicle the instrument panel 10 includes a glove box (not shown) and generally, provisions for a vehicle occupant restraint system (not shown).

FIG. 2 shows a cross-sectional view of the instrument panel 10 of FIG. 1. The instrument panel 10 has a C-shaped cross-section. The cross-section includes an upper surface 28, a front surface 30, and a bottom surface 32. The upper surface 28 is connected to the front surface 30 by a first curved transition 34. The upper surface 28 terminates at the windshield 16 of the vehicle. The front surface 30 connects to the bottom surface 32 by a second curved transition 36. A portion of the interior cavity 38 of the instrument panel 10 is hollow and contains various electronic and mechanical devices such as an occupant restraint system. A light source 40 (FIGS. 2 and 4) of the present invention is located within the interior cavity 38 of the instrument panel 10.

The instrument panel 10 of FIG. 2 is formed from a transparent material 42, ideally plastic, that is molded into the shape of the instrument panel 10. The transparent material 42 includes an interior surface 44 and an exterior surface 46. The light source 40 is mounted adjacent to the interior surface 44 of the transparent material 42. A coating of paint 48 is applied to the exterior surface 46 of the transparent material 42.

The coating of paint 48 may be of any color. The painted surface 52 (FIG. 1) of the instrument panel 10 usually extends over the entire instrument panel 10 excluding the gauge console 20 and the central console.

Figure 3:
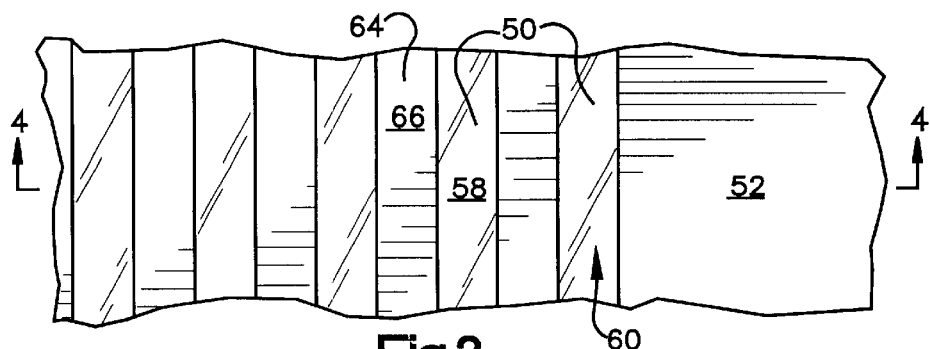
FIG. 3 is an enlarged view of a portion of FIG. 1.

The indicia 12 of the present invention are formed on the instrument panel 10 by removing a portion of the paint to form a plurality of interrelated line segments 50 (FIG. 3). The line segments 50 are formed by exposing the exterior surface 46 of the transparent material 42. The indicia 12 in FIG. 2 are located on the front surface 30 of the instrument panel 10 near the first curved transition 34. The front surface 30 of the instrument panel 10 at the location of the indicia 12 is curved. A perpendicular line extending through the center of the indicia 12 on the front surface 30 of the instrument panel 10 is directed upwardly at an angle of approximately 30 degrees above horizontal.

The indicia 12 shown on the instrument panel 10 of FIG. 1 include a door ajar indicator 54 and a low fuel indicator 56. The door ajar indicator 54 includes a combination of the words "door ajar" and a figure of a vehicle with open doors. The low fuel indicator includes the words "low fuel" surrounded by rectangular box. These indicia 12 are driver indication indicia. Driver indication indicia are intended to inform the driver of a vehicle condition and thus, are located on the instrument panel 10 in a location adjacent the gauge console 20. The indicia 12 in FIG. 1 are located on the instrument panel 10 adjacent the gauge console 20 and vertically above a central console in the vehicle. Backlit indicia 12 provided merely for aesthetic purposes may be located anywhere upon the instrument panel.

As viewed in FIG. 1, the indicia 12 are backlit. When the indicia 12 are not backlit, the indicia 12 are indiscernible from the painted surface 52 of the instrument panel 10.

FIG. 3 shows a magnified view of a portion of the door ajar indicator 54 of FIG. 1. The indicium is formed from a plurality of interrelated line segments 50. The line segments 50 are interrelated to form the indicium, here a door ajar indicator 54. The line segments 50 extend in a direction parallel to each other and may be of various lengths. The line segments 50 illustrated in FIG. 3 all have equal widths. Although line segments of varying width is within the scope of the invention, those skilled in the art will recognize that for ease of manufacture, a common width is preferred.

Figure 4:
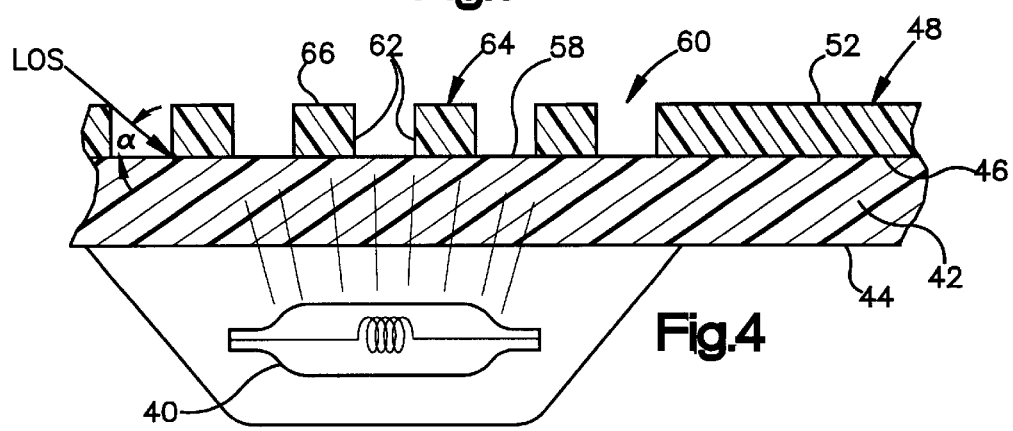
FIG. 4 is a view taken along line 4—4 of FIG. 3.

As best seen in FIGS. 3 and 4, the plurality of line segments 50 is formed in the painted surface 52 of the instrument panel 10. The line segments 50 are formed by removing a portion of the coating of paint 48 to expose the exterior surface 46 of the transparent material 42. Any process or device may be used to remove the paint; however, laser etching with an etching device is preferred.

Each line segment 50 is a groove 60 in the coating of paint 48. Each groove 60 has a bottom surface 58 formed by the transparent material 42 and a pair of parallel side walls 62. The side walls 62 are formed from the coating of paint 48.

The depth or thickness of the coating of paint 48 is the depth of the side walls 62. Ideally, the side walls 62 of each groove 60 are equal in depth.

The distance between the two side walls 62 of a particular groove 60 defines a width of the groove 60. The width of the line segment 50 is equal to the width of the groove 60. In a preferred embodiment, the width of each line segment 50 is less than 0.020 inches. The width of the line segments 50 and the depth of the coating of paint 48 are interrelated as will be discussed in further detail below.

A narrow strip 64 of the coating of paint 48 separates each groove 60. In FIG. 4, each strip 64 has a rectangular cross-section. The side walls of the paint strip 64 form the side walls 62 of the grooves 60. A top surface 66 of the paint strip 64 defines the distance between adjacent grooves 60. The top surface 66 of the paint strip 64 has a span between adjacent grooves 60 of between 50% and 100% of the groove width. The span of the top surface 66 illustrated in FIGS. 3 and 4 is equal to the groove width.

As seen in FIG. 4, a light source 40 is located adjacent an interior surface 44 of the transparent material 42. When actuated, the light source 40 directs light against the interior surface 44 of the transparent material 42. The light from the light source 40 travels through the transparent material 42 and disperses through the line segments 50. The light illuminates both the line segments 50 and the side walls 62 associated with the illuminated line segments 50. Since the line segments 50 form the indicia 12, the light when actuated, illuminates the indicia 12 making it discernible from the painted surface 52 of the instrument panel 10. The indicia 12 will be most visible when the color of the light sharply contrasts with the color of the painted surface 52 of the instrument panel 10. For example, if the painted surface 52 of the instrument panel 10 is tan, the indicia 12 will show more prominently on the instrument panel 10 if the light is red, as opposed to white.

As seen in FIG. 1, the indicia 12 are located to the right of a steering wheel 22 as viewed by a driver of the vehicle. Generally, a driver's head will be located in a position laterally aligned with the center 68 of the steering wheel 22 and vertically above the steering wheel 22. Thus, a probable line of sight from the driver to the indicia 12 is vertically downward and laterally to the right.

In order to make the indicia 12 indiscernible to the vehicle driver when not backlit, the side walls 62 of the grooves 60 should extend in a direction that is angled to the probable line of sight of the driver to the indicia 12. Since the indicia 12 of FIG. 1 lie on a curved surface and are directed vertically upward, when the driver looks at the indicia 12, the probable line of sight for the driver is to the right. As shown in FIG. 4, the groove side walls 62 extend outwardly from the exterior surface 46 of the transparent material 42 at an angle of 90 degrees. Thus, the side walls 62 extend in a direction that is angled to the probable line of sight of the vehicle driver.

If the groove side walls 62 extend in a direction that is angled to the driver's probable line of sight, when the indicia 12 are not backlit the indicia 12 will be indiscernible from the painted surface 52. As illustrated in FIG. 4 with reference to one groove, the driver, when looking at the region of the instrument panel 10 having the indicia 12, will see the top surface 66 of the paint strips 64 and a portion of one side wall 62 of each groove 60, all of which are painted surfaces. Thus, the driver will not be able to distinguish the indicia 12 from the painted surface 52. Even if the driver views the indicia 12 from an angle that allows the driver to see a fraction of the transparent material 42 of the line segments 50, generally no more than 40%, the driver will likely not be able to distinguish the indicia 12 from the painted surface 52 since the line segments 50 are very narrow and 60% of what is seen by the driver is the coating of paint 48.

Although the indicia 12 will likely be indiscernible when the driver can see 40% or less of the transparent material 42 of the line segments 50. It is preferred that the driver not see any of the transparent material 42 of the line segments 50. Thus, when viewing the indicia 12 when backlit, the driver sees the indicia 12 as the light reflects off of the respective groove side walls 62 and when not backlit, the driver sees only painted surfaces. It is in this embodiment that the line segment width is related to the depth of the coating of paint 48.

When forming indicia 12 where the driver sees only painted surfaces, the depth of the coating of paint 48 is related to both the line segment width and to the angle of incidence between the probable line of sight and the transparent material 42 within the line segment 50 nearest the driver. The transparent material 42 within the line segment 50 nearest the driver is used because this will generally indicate the largest angle of incidence and the line segment 50 within which the driver is most likely to see the transparent material 42. The angle of incidence between the probable line of sight and the transparent material 42 within the line segment 50 nearest the driver may be determined given the probable location of the driver's head and the location of the indicia 12. Given the angle of incidence, the relationship between the width of the line segment 50 and the depth of the coating of paint 48 can be determined by geometry. For example, if the angle of incidence is α, then the line segment width and the depth of the coating of paint 48 are related by the tangent of α. Thus, if the line segment width is known, the depth must be greater than or equal to the line segment width times the tangent of α. If the depth of the coating of paint 48 is known, the line segment width must be less than or equal to the depth of the coating of paint 48 divided by the tangent of α. If the side walls 62 of the groove 60 are angled with respect to the exterior surface 46 of the transparent material 42 at an angle other than 90 degrees, the above formulas change slightly to take into account the angle of the side walls 62. However, the relationship between the depth of the coating of paint 48 and the width of the line segments 50 can be calculated using geometric principles.

Figure 5:
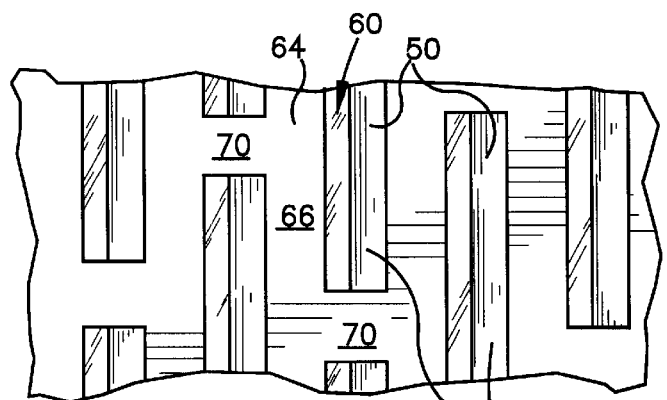
FIG. 5 is a view of a second embodiment of the invention.

FIG. 5 shows a second embodiment of the invention. The line segments 50 in FIG. 5 are broken by narrow sections 70 of paint that extend between adjacent strips 64 of paint. By breaking the line segments 50 with narrow sections 70 of paint, more paint is viewed when the indicia 12 are not backlit. Thus, the indicia 12 are less distinguishable from the painted surface 52. The narrow sections 70 of paint should be randomly positioned in the grooves 60 so that adjacent grooves do not have paint sections 70 in the same location. Paint sections 70 located in the same location of adjacent line segments may alter the indicia 12 by appearing as a line when the indicia 12 are backlit.

Figure 6:
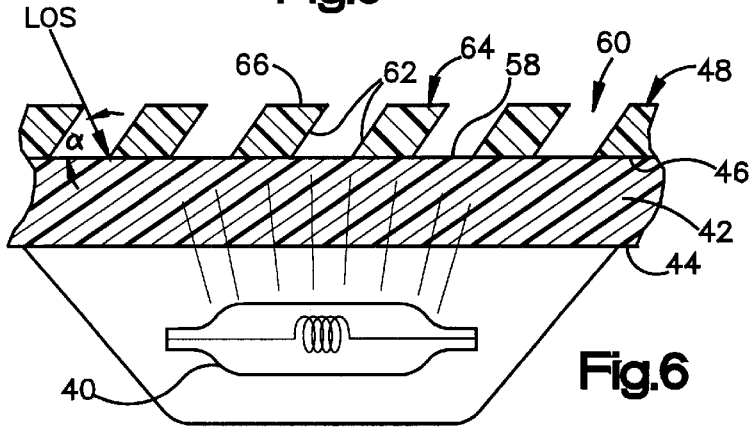
FIG. 6 is a view of a third embodiment of the invention.

FIG. 6 shows a third embodiment of the invention. This embodiment is ideal for indicia 12 that will be viewed with a probable line of sight that is nearly perpendicular to the surface with the indicia 12. The grooves 60 in FIG. 6 still have a bottom surface 58 of transparent material 42 and parallel side walls 62; however, a cross sectional shape of each groove 60, and thus each paint strip 64, is that of a parallelogram. Thus, when the light source 40 is not actuated, the driver sees mostly painted surfaces including the top surfaces 66 of the paint strips 64 and a portion of one side wall 62 within each groove 60. When the indicia are backlit, the driver sees the light illuminating from each groove 60 which forms the indicia. Ideally, the side walls 62 of the grooves 60 will extend in a direction perpendicular to the probable line of sight. At a minimum, the side walls 62 of the groove 60 should extend at an angle such that the angle of intersection between the side walls 62 and the probable line of sight is at least 30 degrees.

From the above description of the invention, those skilled in the art will perceive improvements, changes and modifications. Such improvements, changes and modifications within the skill of the art are intended to be covered by the appended claims.

Having described the invention, the following is claimed:

1. An article comprising:

transparent material having interior and exterior surfaces;

a coating of paint applied to the exterior surface of the transparent material;

indicia formed in the coating of paint by a plurality of interrelated line segments, each line segment of the plurality of line segments extending parallel to each other line segment of the plurality of line segments, each line segment being an exposed portion of the exterior surface of the transparent material and defining a bottom surface of a groove that extends through the coating of paint, the coating of paint defining parallel extending side walls of the groove; and a light source being actuatable for directing light against the interior surface of the transparent material and through the exposed line segments to illuminate the indicia, the indicia being discernible from the coating of paint when illuminated by the light source, the indicia being indiscernible from the coating of paint when not illuminated by the light source and when the side walls of each groove extend in a direction angled to a line of sight.

2. The article as in claim 1 further being defined by:

each groove formed in the paint coating having a width defined by the distance between the side walls, the width of each groove being less than 0.020 inches.

3. The article as in claim 2 further being defined by:

a space between adjacent line segments having a span in the range of 50% to 100% of the groove width.

4. The article as in claim 1 further being defined by:

the article being a vehicle instrument panel.

5. A method of forming backlit indicia on a painted surface of an article, the method comprising the steps of:

(i) forming an article from a transparent material having interior and exterior surfaces;

(ii) applying a coating of paint to the exterior surface of the transparent material;

(iii) removing portions of the coating of paint to form indicia in the coating of paint, the indicia being formed by a plurality of interrelated line segments, each line segment of the plurality of line segments extending parallel to each other line segment of the plurality of line segments, each line segment being an exposed portion of the exterior surface of the transparent material and defining a bottom surface of a groove that extends through the coating of paint, the coating of paint defining parallel extending side walls of the groove; and (iv) positioning an actuatable light source for directing light against the interior surface of the transparent material and through the exposed line segments to illuminate the indicia, the indicia being discernible from the coating of paint when illuminated by the light source, the indicia being indiscernible from the coating of paint when not illuminated by the light source and when the side walls of each groove extend in a direction angled to a line of sight.

6. The method as in claim 5 wherein the step of removing portions of the coating of paint to form indicia in the coating of paint further includes the step of:

limiting a width of each groove to less than 0.020 inches.

7. The method as in claim 6 further including the step of:

providing a space between adjacent grooves, the space having a span in the range of 50% to 100% of the groove width.

8. The method as in claim 5 wherein the step of removing portions of the coating of paint to form indicia in the coating of paint further includes the steps of:

(i) determining a depth of the coating of paint in a location of the indicia;

(ii) determining an angle of incidence of the line of sight to the line segment within a nearest groove; and (iii) calculating a width of the line segments by using the depth of the coating of paint and the angle of incidence.

9. The method as in claim 5 wherein the step of applying a coating of paint to the exterior surface of the transparent material further includes the steps of:

(i) determining a width of the line segments to be removed from the coating of paint;

(ii) determining an angle of incidence of the line of sight to the line segment; and (iii) calculating a depth of the coating of paint by using the width of the line segments and the angle of incidence.

10. The method as in claim 5 wherein the step of removing portions of the coating of paint to form indicia in the coating of paint includes the steps of:

(i) angling an etching device relative to the exterior-surface of the transparent material such that an angle of intersection between the side walls of the groove and the line of sight is at least 30 degrees; and (ii) removing the coating of paint by etching away the coating of paint to expose the transparent material.

11. The method as in claim 5 wherein the article is a vehicle instrument panel.

* * * * *